US012571751B2

(12) United States Patent　　　　　(10) Patent No.:　US 12,571,751 B2
Hager et al.　　　　　　　　　　　　(45) Date of Patent:　　Mar. 10, 2026

(54) ATOMIC OXYGEN SENSOR TELEMETRY

(71) Applicant: Eagle Technology, LLC, Melbourne, FL (US)

(72) Inventors: Mark Alan Hager, West Henrietta, NY (US); Hannah Osgood Dean, Rochester, NY (US); Melody Renee Hawkins, Irondequoit, NY (US)

(73) Assignee: Eagle Technology, LLC, Melbourne, FL (US)

( * ) Notice: Subject to any disclaimer, the term of this patent is extended or adjusted under 35 U.S.C. 154(b) by 271 days.

(21) Appl. No.: 18/343,827

(22) Filed: Jun. 29, 2023

(65) Prior Publication Data

US 2025/0003911 A1　　　Jan. 2, 2025

(51) Int. Cl.
　　*G01N 27/12*　　　　(2006.01)
(52) U.S. Cl.
　　CPC ................................. *G01N 27/125* (2013.01)
(58) Field of Classification Search
　　CPC .. G01N 27/125; G01R 33/00; G01R 33/0035;
　　　　　　　　　　　　　　　　　　　G01R 33/0023
　　See application file for complete search history.

(56) References Cited

U.S. PATENT DOCUMENTS

2020/0348412 A1* 11/2020 Durham .................. H01Q 21/28
2020/0370495 A1* 11/2020 Gose ................... F02D 41/1494

FOREIGN PATENT DOCUMENTS

CN　　101710091 B　　10/2011
CN　　101710092 B　　10/2011
CN　　109060894 A　* 12/2018　........... G01N 27/126

OTHER PUBLICATIONS

Brandon E.A. Holmes, et al., "A review of satellite-based atomic oxygen sensing methods", Progress in Aerospace Sciences 137 (Feb. 2023) 100886, 10 pages.

* cited by examiner

*Primary Examiner* — Lee E Rodak
*Assistant Examiner* — Taqi R Nasir
(74) *Attorney, Agent, or Firm* — Edell, Shapiro & Finnan, LLC

(57)　　　　　　　ABSTRACT

A sensor system for a spacecraft comprising: atomic oxygen sensors including graphite strips to provide resistances that increase as the graphite strips ablate away when exposed to atomic oxygen, the atomic oxygen sensors configured to generate first sensor signals indicative of the resistances and, correspondingly, atomic oxygen fluence to which the atomic oxygen sensors are exposed; thermistors to generate second sensor signals indicative of temperature; sensor circuits that are identically configured to each other and that include first sensor circuits to convert the first sensor signals to digitized first signals and second sensor circuits to convert the second sensor signals to digitized second signals; and a controller to process the digitized first signals and the digitized second signals.

16 Claims, 8 Drawing Sheets

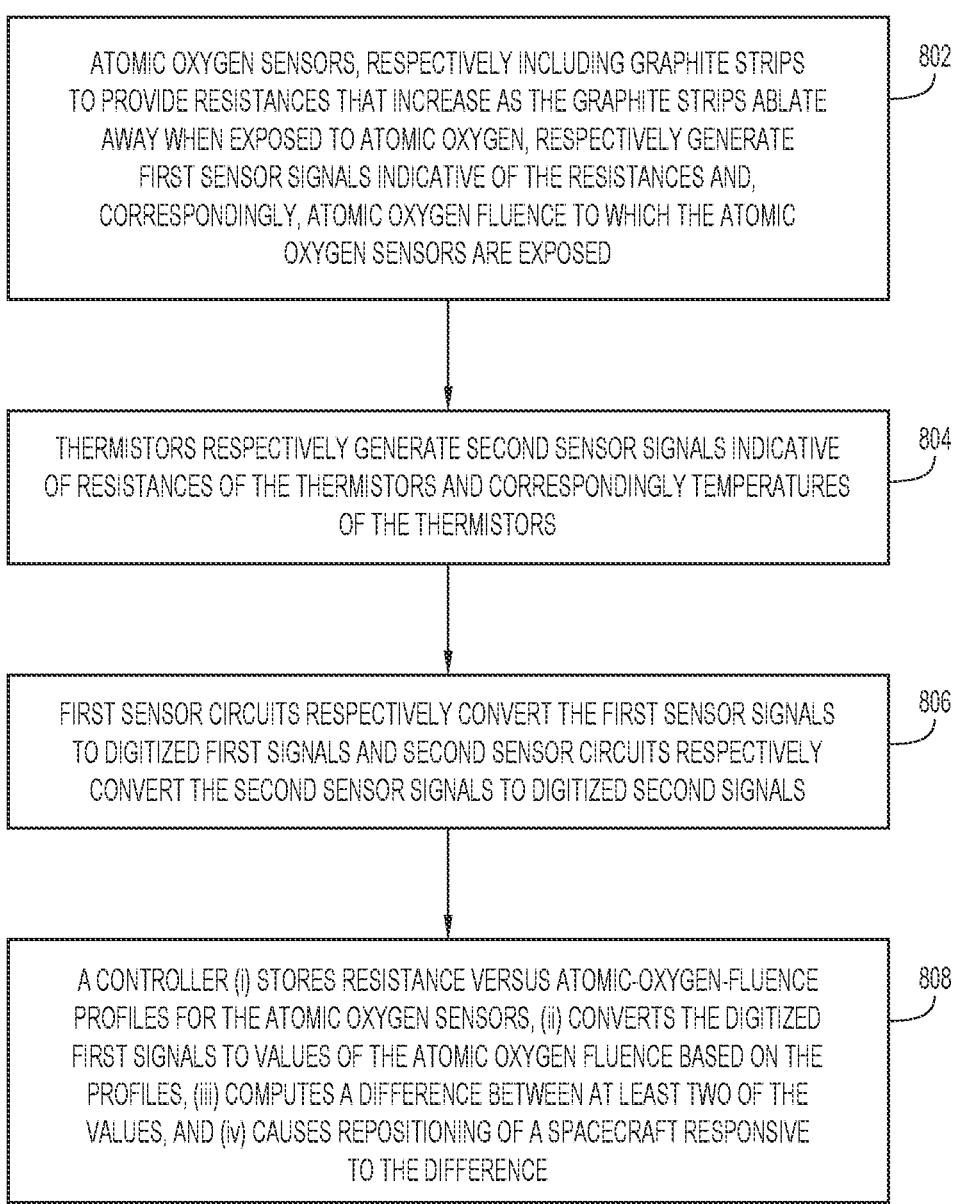

800

ATOMIC OXYGEN SENSORS, RESPECTIVELY INCLUDING GRAPHITE STRIPS TO PROVIDE RESISTANCES THAT INCREASE AS THE GRAPHITE STRIPS ABLATE AWAY WHEN EXPOSED TO ATOMIC OXYGEN, RESPECTIVELY GENERATE FIRST SENSOR SIGNALS INDICATIVE OF THE RESISTANCES AND, CORRESPONDINGLY, ATOMIC OXYGEN FLUENCE TO WHICH THE ATOMIC OXYGEN SENSORS ARE EXPOSED — 802

THERMISTORS RESPECTIVELY GENERATE SECOND SENSOR SIGNALS INDICATIVE OF RESISTANCES OF THE THERMISTORS AND CORRESPONDINGLY TEMPERATURES OF THE THERMISTORS — 804

FIRST SENSOR CIRCUITS RESPECTIVELY CONVERT THE FIRST SENSOR SIGNALS TO DIGITIZED FIRST SIGNALS AND SECOND SENSOR CIRCUITS RESPECTIVELY CONVERT THE SECOND SENSOR SIGNALS TO DIGITIZED SECOND SIGNALS — 806

A CONTROLLER (i) STORES RESISTANCE VERSUS ATOMIC-OXYGEN-FLUENCE PROFILES FOR THE ATOMIC OXYGEN SENSORS, (ii) CONVERTS THE DIGITIZED FIRST SIGNALS TO VALUES OF THE ATOMIC OXYGEN FLUENCE BASED ON THE PROFILES, (iii) COMPUTES A DIFFERENCE BETWEEN AT LEAST TWO OF THE VALUES, AND (iv) CAUSES REPOSITIONING OF A SPACECRAFT RESPONSIVE TO THE DIFFERENCE — 808

FIG.8

ATOMIC OXYGEN SENSOR TELEMETRY

TECHNICAL FIELD

The present disclosure relates generally to atomic oxygen sensors and associated sensor circuits for spacecraft.

BACKGROUND

A spacecraft that flies in a low earth orbit (LEO) is particularly susceptible to the effects of atomic oxygen (AO). AO has negative effects on many materials employed on a spacecraft system, such as a space telescope. For example, AO degrades/erodes silvered optical coatings, Kapton, and other materials used on the spacecraft system. Mitigation of these effects increases the operational life of the spacecraft system and improves its performance. Characterizing the effects of AO on the materials gives evidence of the efficacy of AO mitigation techniques. In support of the mitigation techniques, a conventional spacecraft sensor system employs AO sensors coupled to dedicated sensor and telemetry circuits. The dedicated nature of the aforementioned circuits disadvantageously adds to the consumption of valuable spacecraft resources, such as power and space, and increases cost, mass, and complexity.

BRIEF DESCRIPTION OF THE DRAWINGS

FIG. 8 is a flowchart of an example method performed by the sensor system.

DESCRIPTION OF EXAMPLE EMBODIMENTS

Overview

In an embodiment, a sensor system for a spacecraft comprises: atomic oxygen sensors including graphite strips to provide resistances that increase when exposed to atomic oxygen that erodes the graphite strips, the atomic oxygen sensors configured to generate first sensor signals indicative of the resistances and, correspondingly, atomic oxygen fluence to which the atomic oxygen sensors are exposed; thermistors to generate second sensor signals indicative of temperature; sensor circuits that are identically configured to each other and that include first sensor circuits to convert the first sensor signals to digitized first signals and second sensor circuits to convert the second sensor signals to digitized second signals; and a controller to process the digitized first signals and the digitized second signals.

Example Embodiments

Embodiments presented herein are directed to a sensor system for a spacecraft. The sensor system includes atomic oxygen sensors, temperature sensors, and sensor circuits to condition and digitize sensor signals produced by the oxygen sensor and the temperature sensors. The sensor circuits are compatible with, and interchangeable between, the atomic oxygen sensors and the temperature sensors. That is, the sensor circuits may be reused between the different types of sensors. The reusable/interchangeable nature of the sensor circuits advantageously reduces power and space consumed by the sensor circuits, and also reduce complexity and cost, compared to conventional sensor circuits that cannot be shared between the different types of sensors.

Figure 1:
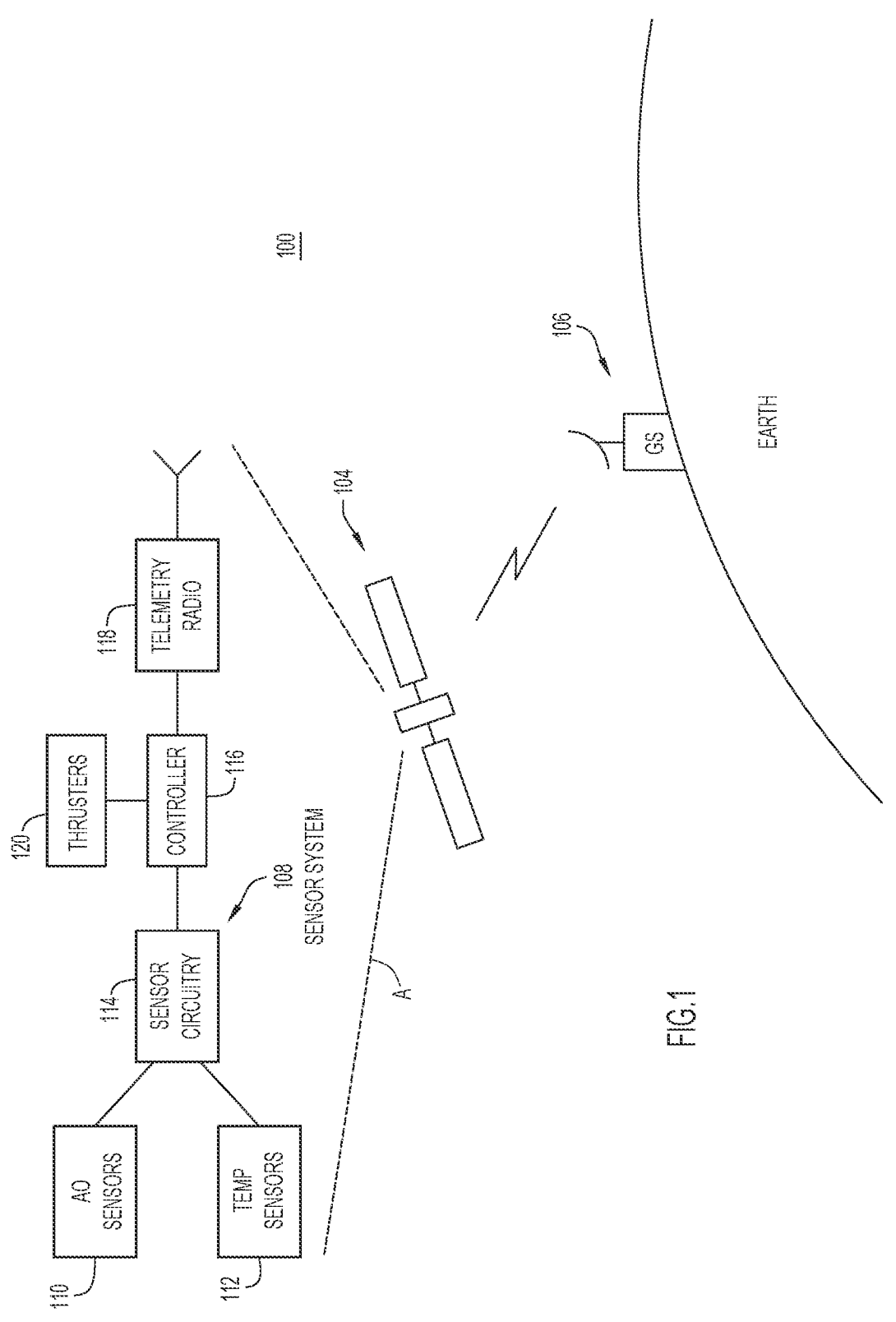
FIG. 1 is an illustration of an example spacecraft environment in which embodiments directed to sensing of atomic oxygen (AO) using a sensor system may be implemented.

FIG. 1 is an illustration of an example spacecraft environment 100 in which embodiments directed to sensing of atomic oxygen (AO) may be implemented. Spacecraft environment 100 includes a spacecraft 104 (also referred to as a "space vehicle") orbiting the earth above a ground station (GS) 106. Spacecraft 104 may include any of a space station, satellite, space telescope, and so on. Spacecraft 104 may fly in a low earth orbit (LEO) or other type of orbit, for example. As shown in an expanded view A, spacecraft 104 includes/carries a sensor system 108 (also referred to as a "telemetry system") comprising atomic oxygen sensors 110 mounted to the spacecraft, temperature sensors 112 mounted to the spacecraft, sensor circuitry 114, a controller 116, and a telemetry radio 118 to communicate with ground station 106 through telemetry channels. Spacecraft 104 also includes thrusters 120 (and/or thruster actuators) configured to maneuver spacecraft 104 responsive to maneuver commands from the controller. Controller 116 may receive the maneuver commands from ground station 106 over the telemetry channels. Alternatively, the maneuver commands may originate from controller 116 responsive to sensed conditions of spacecraft 104. Spacecraft 104 includes other subsystems not shown in FIG. 1.

Atomic oxygen sensors 110 generate first sensor signals indicative of atomic oxygen sensed by the atomic oxygen sensors, and temperature sensors 112 generate second sensor signals indicative of temperature sensed by the temperature sensors. Sensor circuitry 114 includes (i) first sensor circuits to condition and convert the first sensors signals to digitized first signals and to provide the same to controller 116, and (ii) second sensor circuits to condition and convert the second sensor signals to digitized second signals and to provide the same to the controller. Controller 116 translates the digitized first signals to atomic oxygen fluence readings or values based on signal conversion information stored by the controller and transmits the same to ground station 106 over the telemetry channels. Controller 116 also translates the digitized second signals to temperature readings or values based on signal conversion information stored by the controller and transmits the same to ground station 106 over the telemetry channels. As used herein, the term "fluence" may be singular or plural depending on context.

According to embodiments presented herein, the first and second sensor circuits are configured similarly or identically to each other and are therefore compatible with other and may be used interchangeably with both atomic oxygen sensors 110 and temperature sensors 112. For example, the first sensor circuits may be swapped with the second sensor circuits to convert the second sensor signals to digitized signals for consumption by controller 116 and vice versa. On a spacecraft that has existing temperature sensing telemetry circuits configured to receive readings from thermistors as sensed spacecraft temperatures, embodiments presented herein may replace at least some of the thermistors with atomic oxygen sensors that provide sensed atomic oxygen readings to the existing temperature sensing telemetry circuits, which then operate as atomic oxygen sensing telemetry circuits. Such reuse advantageously reduces cost, complexity, and space requirements.

Figure 2:
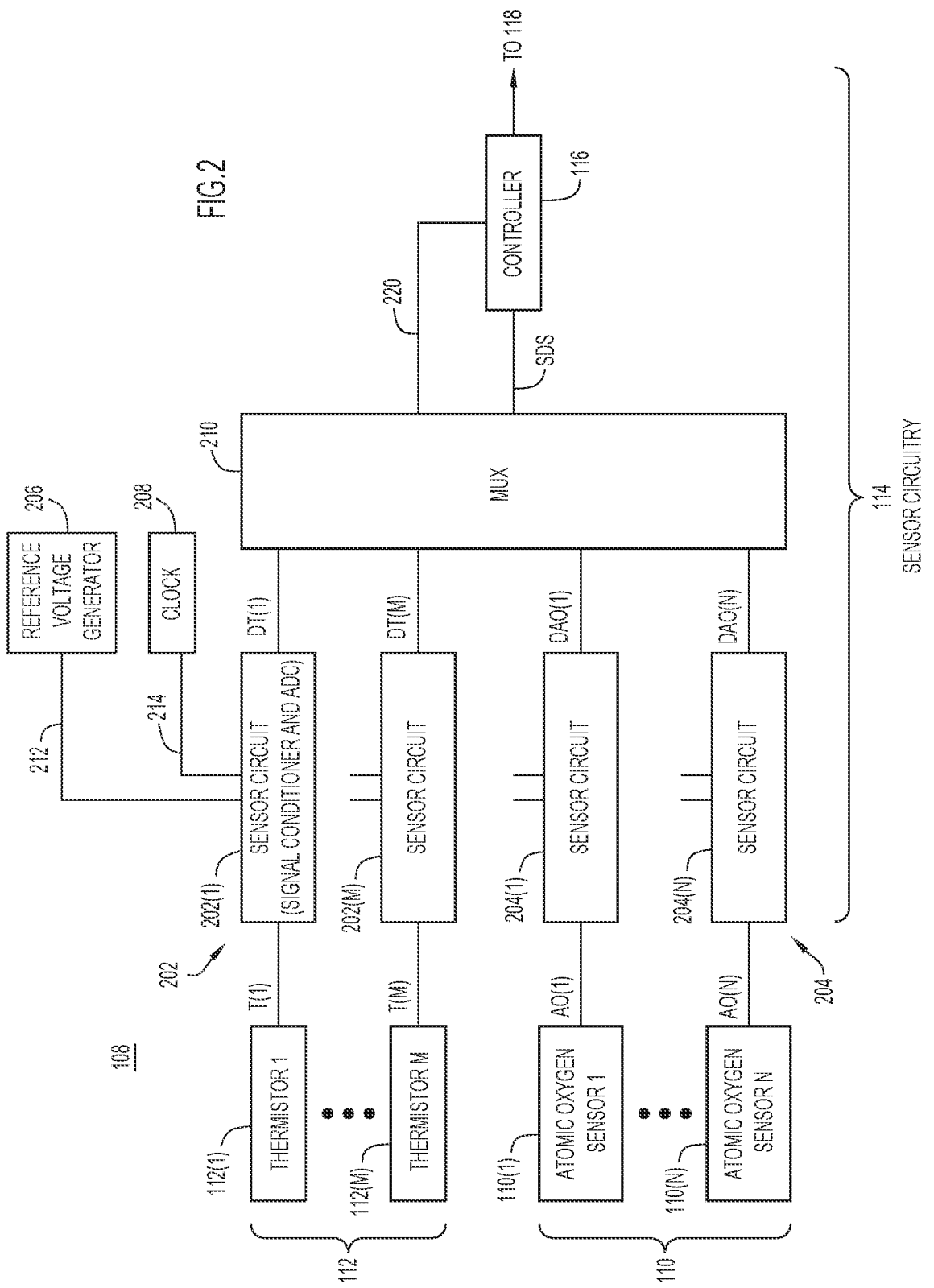
FIG. 2 is a block diagram expanding on atomic sensors, temperature sensors, sensor circuitry, and a controller of the sensor system of FIG. 1, according to an embodiment.

FIG. 2 is a block diagram expanding on sensor system 108 according to an embodiment. Temperature sensors 112 (each referred to as a "thermistor" in FIG. 2) include temperature sensors 112(1)-112(M). Temperature sensors 112 may each be configured as a thermistor to sense temperature. The thermistor has a resistance that varies as a function of a temperature in accordance with a resistance vs. temperature response or profile for the thermistor. Thus, the resistance is indicative of its temperature.

Atomic oxygen sensors 110 include atomic oxygen sensors 110(1)-110(N). Atomic oxygen sensors 110 may each be configured with a graphite structure to sense atomic oxygen. The graphite structure has a resistance that varies as a function of an atomic oxygen fluence to which the graphite structure is exposed in accordance with a resistance vs. atomic-oxygen-fluence response or profile of the graphite structure. Thus, the resistance is indicative of the atomic oxygen fluence.

Sensor circuitry 114 includes sensor circuits 202(1)-202 (M) (collectively referred to as sensor circuits 202) respectively coupled to corresponding ones of temperature sensors 112(1)-112(M), sensor circuits 204(1)-204(N) (collectively referred to as sensor circuits 202) respectively coupled to corresponding ones of atomic oxygen sensors 110(1)-110 (N), a reference voltage generator 206, a clock 208, and a multiplexer (MUX) 210. Sensor circuits 202 and 204 may also be referred to as "sensor signal converters." Reference voltage generator 206 provides a reference voltage 212 to each sensor circuit. Clock 208 provides a clock signal 214 (also referred to as a clock wave) to each sensor circuit. As mentioned above, sensor circuits 202 and 204 are configured similarly or identically to one another and are each compatible (i.e., operate successfully) with either an atomic oxygen sensor or a temperature sensor.

Atomic oxygen sensors 110(1)-110(N) respectively generate first sensor signals AO(1)-AO(N) having amplitudes/levels indicative of resistances of their graphite structures and therefore the atomic oxygen fluence to which the atomic oxygen sensors have been exposed, and provide the same to corresponding ones of sensor circuits 204(1)-204(N) in parallel. Sensor circuits 204(1)-204(N) condition and digitize first sensor signals AO1(1)-AO(N) in parallel based on reference voltage 212 and clock signal 214 to produce first digitized signals DAO(1)-DAO(N) representative of the first sensor signals and therefore the atomic oxygen fluence. Sensor circuits 204(1)-204(N) provide first digitized signals DAO(1)-DAO(N) to corresponding/respective inputs of multiplexer 210 in parallel.

Temperature sensors 112(1)-112(N) respectively generate second sensor signals T(1)-T(M) having amplitudes/levels indicative of resistances of the temperature sensors and therefore the temperatures of the temperature sensors, and provide the same to corresponding ones of sensor circuits 202(1)-202(M) in parallel. Sensor circuits 202(1)-202(M) condition and digitize second sensor signals T1(1)-T(M) in parallel based on reference voltage 212 and clock signal 214 to produce second digitized signals DT(1)-DT(M) representative of the second sensor signals and therefore the temperatures. Sensor circuits 202(1)-202(M) provide second digitized signals DT(1)-DT(M) to corresponding/respective inputs of multiplexer 210 in parallel.

Multiplexer 210 receives digitized first signals DAO(1)-DAO(N) and digitized second signals DT(1)-DT(M) in parallel. Responsive to a selection signal 220 (e.g., a multibit word) generated by controller 116, multiplexer 210 selects one of the digitized first signals and the digitized second signals as a selected digitized signal SDS, and provides the same to controller 116. Under control of controller 116, multiplexer 210 sequentially passes selected ones of digitized first signals DAO(1)-DAO(N) and digitized second signals DT(1)-DT(N) to the controller, and the controller processes the digitized first signals and the digitized second signals.

For example, controller 116 may translate each digitized first signal DAO(i) received from multiplexer 210 to a corresponding atomic oxygen fluence reading based on the resistance vs. atomic-oxygen-fluence profile, and transmit the atomic oxygen fluence reading to ground station 106 over a corresponding telemetry channel. Similarly, controller 116 may translate each digitized second signal DT(i) to a corresponding temperature reading based on the resistance vs. temperature profile, and transmit the temperature reading to ground station 106 over a corresponding telemetry channel. Controller 116 may further process the atomic oxygen fluence readings and the temperature readings, as described below.

Figure 3:
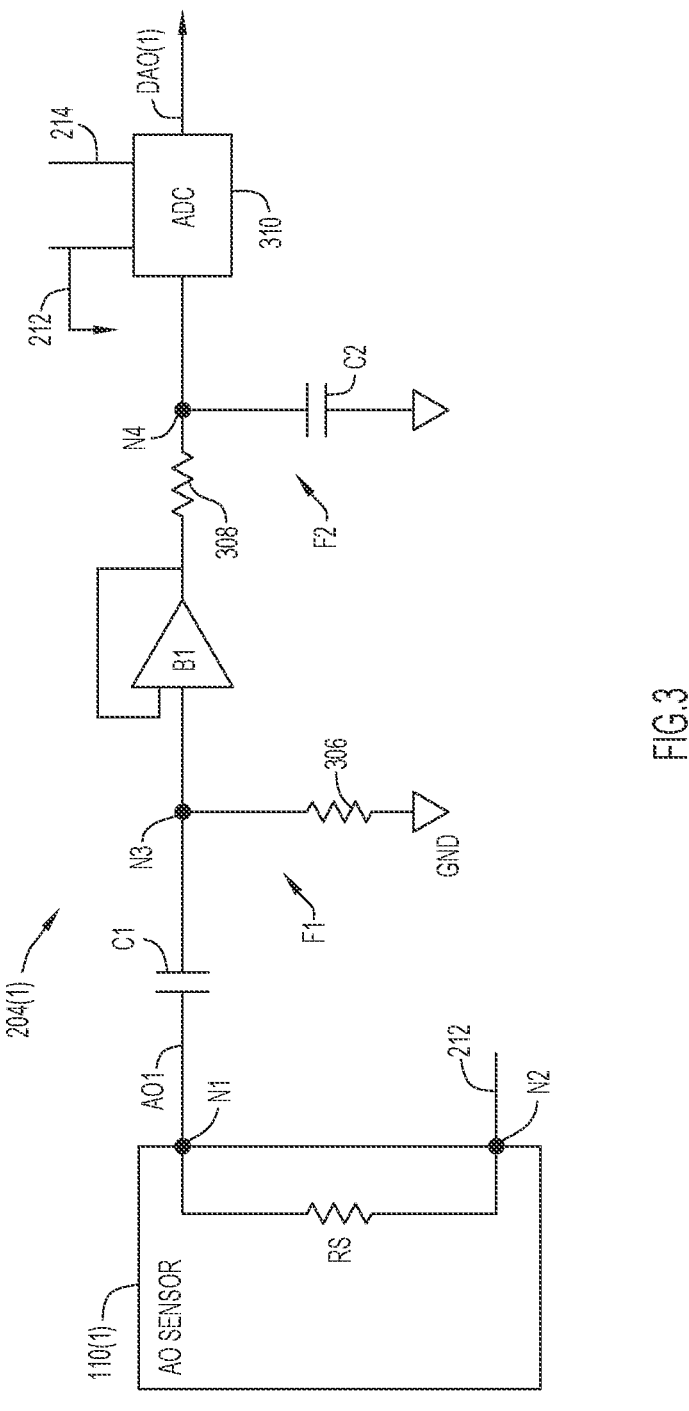
FIG. 3 is a circuit diagram of an example sensor circuit of the sensor circuitry.

FIG. 3 is a circuit diagram of sensor circuit 204(1) according to an embodiment. Sensor circuit 204(1) is configured similarly or identically to other ones of sensor circuits 204 and to each of sensor circuits 202. Therefore, the description of sensor circuit 204(1) shall suffice for the other sensor circuits. Sensor circuit 204(1) is coupled to a node N1 and a node N2 of atomic oxygen sensor 110(1). Atomic oxygen sensor 110(1) is modeled as a sensor resistor RS coupled to/across nodes N1, N2. Sensor circuit 204(1) includes: a first filter F1 comprising a capacitor C1 coupled from node N1 to a node N3, and a resistor 306 coupled from node N3 to ground (GND); a buffer amplifier B1 having a first input coupled to node N3 and a second input coupled to an output of the buffer amplifier; a second filter F2 having a resistor 308 coupled from the output of the buffer amplifier to a node N4, and a capacitor C2 coupled from node N4 to ground; and an analog-to-digital converter (ADC) 310 having an input coupled to node N4 and an output coupled to a respective input of multiplexer 210 (not shown in FIG. 3). Sensor circuit 204(1) also provides reference voltage 212 (or another voltage, such as a supply voltage VCC for sensor circuit 204(1)) to node N2 of atomic oxygen sensor 110(1). Thus, reference voltage 212 is a common reference voltage to all sensor circuits and clock signal 214 is as common clock signal to all sensor circuits.

At a high-level, sensor circuit 204(1) conditions and digitizes first sensor signal AO1 generated by atomic oxygen sensor 110(1) at node N1, to produce digitized first signal DAO(1). More specifically, first filter F1, buffer amplifier B1, and second filter F2 respectively operate to filter, buffer, and then filter again first sensor signal AO1, in series, to produce a filtered buffered sensor signal, and provide the same to ADC 310. Filters F1 and F2 perform lowpass and anti-aliasing filtering of first sensor signal AO1, for example. ADC 310 digitize the filtered buffered sensor signal based on reference voltage 212 and clock signal 214 to produce digitized first signal DAO1, which represents first sensor signal AO1 in digitized form.

In an example, each temperature sensor 112($i$)/thermistor may have a resistance that varies over a resistance range of 8-12 kΩ(e.g., about a nominal thermistor resistance of about 8-12 kΩ) to indicate a corresponding temperature range. The circuit components of each sensor circuit 202($i$) and each sensor circuit 204($i$)) may be identical to each other (have identically arranged circuit components that have the same/matching component values) so as to be matched to the aforementioned resistance range. That is, each sensor circuit may register resistance changes over the resistance range as corresponding changes in digitized values (over a digitized value range corresponding to the resistance range) produced by the ADC. In an example, a 12-bit ADC provides a resolution of approximately 3 to 4Ω, which is sufficiently granular to be responsive to small resistance changes of each temperature sensor and each atomic oxygen sensor as represented in each sensor signal (T(i) or AO(i)). Moreover, each atomic oxygen sensor 110($i$) may be configured to have a resistance that varies over the same resistance range (approximately) as each temperature sensor 112($i$). That is, each atomic oxygen sensor is configured to have an operating resistance range that overlaps with the operating resistance range of each temperature sensor. Therefore, each sensor circuit may produce digitized values of resistance across a resistance range over which both the atomic oxygen sensors and the temperature sensors operate, which permits the sensor circuits to be interchangeable/reusable/swappable between the atomic oxygen sensors and the temperature sensors.

In summary, the atomic oxygen sensors and the temperature sensors (e.g., thermistors) each operates over a common resistance range (i.e., an overlapping resistance range) about a common nominal resistance, and generates a respective sensor signal having distinct amplitudes across a range of amplitudes that indicate distinct resistances across the common resistance range. The first sensor circuits and the second sensor circuits each converts the distinct amplitudes (and thus the distinct resistances) to corresponding distinct digitized values. Therefore, the first sensor circuits and the second sensor circuits are matched to each other and may be interchanged with (i.e., used in place of) each other.

Figure 4:
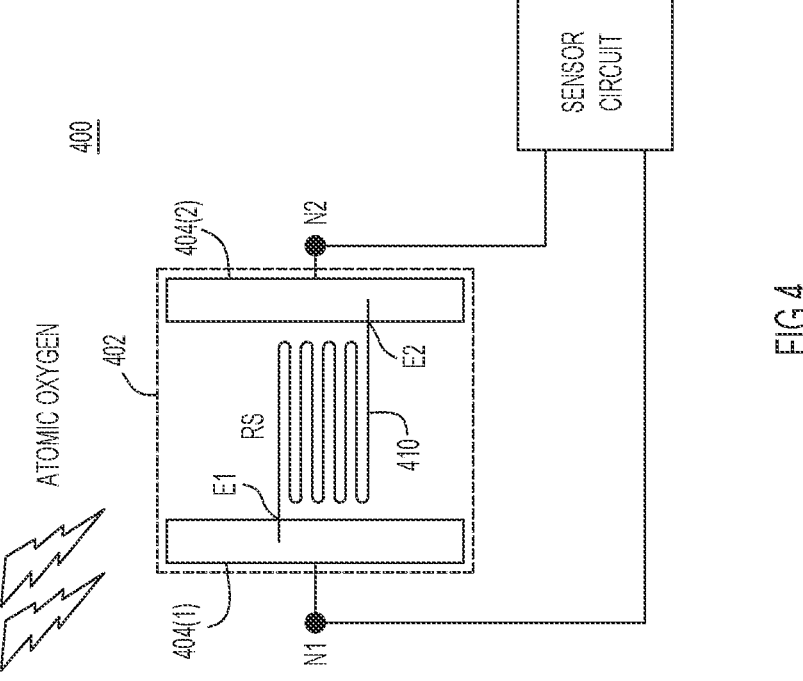
FIG. 4 is a diagram of an example atomic oxygen sensor configured with a graphite strip.

FIG. 4 is a diagram of an example atomic oxygen sensor 400 that employs a single graphite strip according to an embodiment. Atomic oxygen sensor 400 includes a substrate 402 that is substantially planar. Substrate 402 may be a ceramic substrate, such as aluminum oxide, or other electrically insulating material suitable as a substrate or base. Atomic oxygen sensor 400 includes an electrode 404(1) and an electrode 404(2) formed on substrate 402 so as to be separated from each other. Electrodes 404(1), 404(2) may comprise gold or other suitable electrically conductive metal, for example, deposited on substrate 402 using any known or hereafter developed deposition technique. Electrodes 404(1), 404(2) are each elongated in a first direction and spaced-apart from each other (i.e., opposing each other in spaced-relation) in a second direction that is transverse to the first direction, such that the electrodes are parallel to each other. Electrodes 404(1), 404(2) may be connected to opposing nodes of atomic oxygen sensor 400, such as nodes N1, N2 described above in connection with FIG. 3.

Atomic oxygen sensor 400 includes a graphite strip 410 (also referred to as a graphite trace or film) formed on substrate 402 so as to extend between and be coupled to electrodes 404(1), 404(2). Graphite strip 410 is uncovered so that when atomic oxygen sensor 400 is mounted to spacecraft 104, the graphite strip is exposed to atomic oxygen as the spacecraft flies along its orbit. In the example of FIG. 3, graphite strip 410 has an elongated serpentine shape. Graphite strip 410 may be formed on substrate 402 using any known or hereafter developed technique to deposit the graphite strip. Such techniques may include silk screen deposition, or graphite ink printing (e.g., using ink jet printing) that deposits the graphite strip as a carbon ink trace.

Graphite strip 410 has opposing ends E1, E2 respectively coupled to electrodes 404(1), 404(2). Graphite strip 410 has dimensions including a length l, a width w, and a thickness z (directed/measured normally to the planar surface of substrate 402) that define a volume $V = l \cdot w \cdot z$ of the graphite strip, where $w \cdot z$ represents a cross-sectional area transverse to length l. Graphite strip 410 represents a resistor RS (i.e., a graphite strip resistor) having a resistance coupled between electrodes 404(1), 404(2). The resistance varies as volume V varies; more specifically, as cross-sectional area $w \cdot z$ varies, assuming that length l remains relatively constant. For example, the resistance increases and decreases as the volume V (especially the cross-sectional area) increases and decreases, respectively. When initially formed on substrate 402, graphite strip 410 has an initial or "fresh" volume that is a maximum volume of the graphite strip.

When exposed to atomic oxygen, graphite strip 410 gradually ablates-away or erodes over time, which decreases volume V of the graphite strip starting with the initial volume. As a result, the resistance of graphite strip 410 gradually increases, from a minimum resistance corresponding to the initial volume, due to the exposure of the graphite strip to the atomic oxygen. At any given time, the resistance is indicative of an amount of atomic oxygen to which graphite strip 410 has been exposed up to the given time. This is referred to as the atomic oxygen fluence, which is a product of atomic oxygen flux (e.g., atoms/cm²/sec) incident to graphite strip 410 and a period of time over which the graphite strip has been exposed to the atomic oxygen flux. At a point of maximum atomic oxygen fluence that graphite strip 410 can sense, a portion of graphite strip 410 will ablate away to nothing, which introduces an open-circuit between electrodes 404(1), 404(2). This condition represents a maximum resistance state of graphite strip 410. The maximum atomic oxygen fluence that graphite strip 410 can sense is a function of the initial volume of the graphite strip. In summary, graphite strip 410 ablates at a known rate directly correlated to the atomic oxygen exposure, and the resistance of the graphite strip varies as the graphite ablates. Therefore, a measurement of the resistance indicates the atomic oxygen fluence.

In an embodiment in which atomic oxygen sensors 110 are configured similarly to atomic oxygen sensor 400, the oxygen sensors may be formed with respective graphite strips that have equal thicknesses. In another embodiment, the oxygen sensors may be formed with respective graphite strips that have different thicknesses. In other words, the graphite strips of different ones of the atomic oxygen sensors are formed with different thicknesses to sense different maximum atomic fluence, respectively. For example, atomic oxygen sensors 110 may include (i) a first atomic oxygen sensor (e.g., atomic oxygen sensor 110(1)) that includes a first graphite strip having a first thickness to sense a first maximum atomic oxygen fluence, and (ii) a second atomic oxygen sensor (e.g., atomic oxygen sensor 110(2)) that includes a second graphite strip having a second thickness that is greater than the first thickness to sense a second maximum atomic fluence that is greater than the first atomic oxygen fluence.

Figure 5:
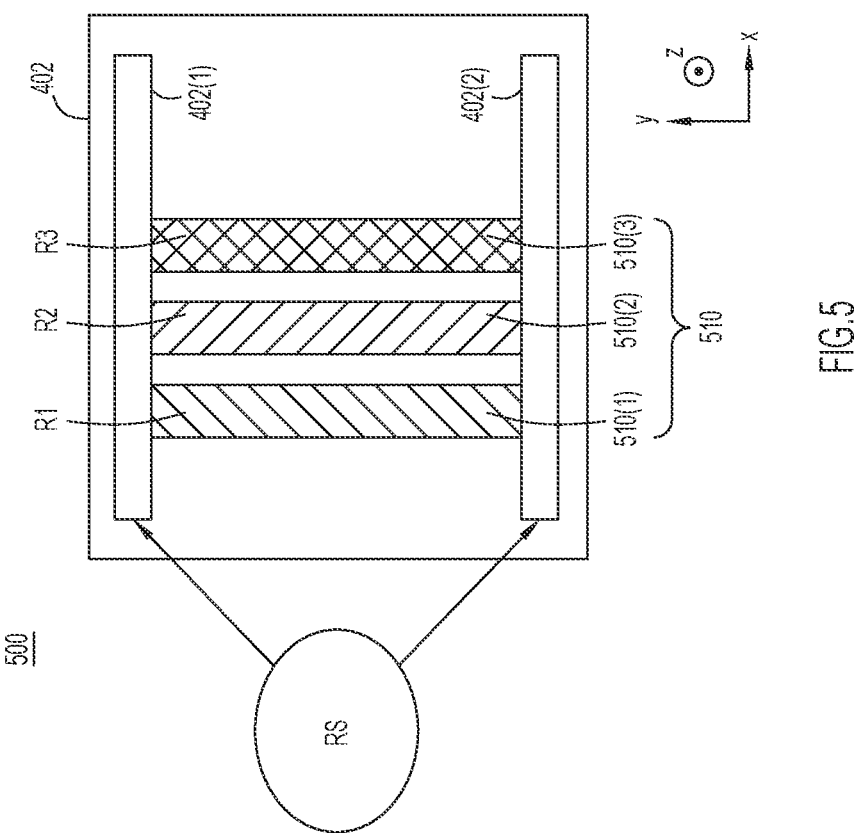
FIG. 5 is a diagram of an example atomic oxygen sensor configured with multiple graphite strips connected in parallel.

FIG. 5 is a diagram of an example atomic oxygen sensor 500 according to another embodiment. Atomic oxygen sensor 500 is constructed on substrate 402 and includes electrodes 404(1), 404(2) as described above. Atomic oxygen sensor 500 includes multiple parallel, spaced-apart, rectangularly-shaped, graphite strips 510 formed on substrate 402 so as to be uncovered and to extend between and be coupled to electrodes 404(1), 404(2). More specifically, graphite strips 510 include a graphite strip 510(1), a graphite strip 510(2), and a graphite strip 510(3) formed on substrate 402. Each graphite strip 510($i$) has a length l that extends from electrode 404(1) to electrode 404(2) in a first direction (which extends in parallel with each adjacent graphite strip) and has opposing ends coupled to respective ones of the electrodes. Graphite strips 510(1), 510(2), and 510(3) are spaced-apart from each other in a second direction transverse to the first direction.

Individual graphite strips 510(1), 510(2), and 510(3) have volumes $V1=l1 \cdot w1 \cdot z1$, $V2=l2 \cdot w2 \cdot z2$, $V3=l3 \cdot w3 \cdot z3$ to form individual resistances R1, R2, and R3 that vary as the volumes vary, respectively (as described above). Individual resistances R1, R2, and R3 are connected in parallel between and to electrodes 504(1), 504(2) to form a total (parallel) resistance RS for atomic oxygen sensor 500, where $1/RS=1/R(1)+1/R(2)+1/R3$. That is, the individual resistances combine into a total parallel resistance. In general, the characteristics of the parallel graphite strips of atomic oxygen sensor 500 are matched to the operational characteristics of the sensor circuit connected to the atomic oxygen sensor such that (i) a change in resistance in the graphite strips is detectable, (ii) a total resistance of the graphite strips is in an operating range of the sensor circuit, and (iii) thicknesses of the graphite strips are designed for a total amount of atomic oxygen fluence the atomic oxygen sensor is expected to detect.

In an example, a graphite strip 510($i$) (e.g., 510(1)) has the following dimensions when sized to provide an initial resistance of approximately 10 kΩ (i.e., Ri=10 kΩ) prior to exposure to atomic oxygen:
  a. Length l=49.33 cm.
  b. Width w=0.04 cm.
  c. Depth/thickness z=0.0037 cm.
  d. Uncovered Top Area (also referred to as trace area) =1.9733 cm².
  e. Resistivity x=0.03 ohm-cm.
  f. Resistance Ri of graphite strip 510($i$) may derived analytically as $R=(x \cdot l)/(z \cdot w)$.

Prior to exposure to atomic oxygen, resistance Ri of graphite strip 510($i$)=10 kΩ. When exposed to atomic oxygen over time, graphite strip 510($i$) gradually ablates away, the thickness z of the graphite strip gradually decreases, and resistance Ri gradually increases according to the atomic oxygen exposures listed in Table 1 below:

and 100%. The steps in resistance Ri result primarily from depth (i.e., thickness) erosion of graphite strip 510($i$) caused by the atomic oxygen. Such resistance changes are well within the detectable range of each of sensor circuits 202 and 204 (e.g., which may detect and convert to digitized form resistance changes with a resolution of 3 to 4Ω, for example).

In one embodiment, graphite strips 510(1), 510(2), and 510(3) are formed to be equal in size, e.g., to have equal thicknesses. In that case, graphite strips 510(1), 510(2), and 510(3) have equal resistances when initially formed. When the graphite strips 510 have equal thicknesses, they all ablate away to open circuits (i.e., infinite resistances) at approximately the same time when exposed to atomic oxygen because the graphite strips are all exposed to equal atomic oxygen fluence per unit area. In another embodiment, graphite strips 510(1), 510(2), and 510(3) are formed to have different sizes and thus different volumes, which provide different resistances connected in parallel. For example, the individual graphite strips are formed with individual graphite thicknesses that differ from one another such that the individual resistances differ from one another. More specifically, graphite strips 510(1), 510(2), and 510(3) may be formed with different thicknesses, such as stepped thicknesses (i.e., depths) $z1<z2<z3$, which provide stepped resistances $R1>R2>R3$. In this arrangement, the thicker graphite strips (in the z-dimension) take longer to ablate away to open circuits when exposed to atomic oxygen than the thinner graphite strips (in the z-dimension) when exposed to the atomic oxygen. The example of FIG. 5 uses three parallel graphite strips, although more or less graphite strips may be used in different configurations.

When exposed to atomic oxygen, each graphite strip 510($i$) gradually degrades and gradually increases in resistance until the degradation causes graphite strip 510($i$) to form an open-circuit (i.e., the graphite strip breaks), at which time the resistance sharply increases in a stepped response. At the same time, the other graphite strips may remain intact. Thus, total (parallel) resistance RS of parallel graphite strips 510(1), 510(2), and 510(3) increases in a series of steps as the graphite strips sequentially degrade to their open-circuit conditions. This provides three points on a resistance vs. atomic oxygen fluence curve that enables plotting of the atomic oxygen fluence at three distinct times. Having three (or more) such points enables use of a simple polynomial algorithm to predict the atomic oxygen fluence over time by extrapolating data points. This is particularly useful when the graphite ablation due to the atomic oxygen cannot be monitored continuously. For example, periodic resistance measurements may be made in search of a step change in resistance that yields a next data point to plot. In addition, the stepped approach using the parallel strips advantageously allows detection of larger atomic oxygen fluence milestones, which can be used to extrapolate a curve as mentioned above. Another advantage is that the parallel

TABLE 1

|  | Unit | Start | 33% AO fluence | 66% AO fluence | 100% AO fluence |
|---|---|---|---|---|---|
| Resistance Ri | Ω | 10000 | 10626.47371 | 11336.68736 | 12175.05758 |
| Resistance Δ | Ω |  | 626.4737052 | 710.2136535 | 838.3702261 |

As shown in Table 1, resistance Ri of graphite strip 510($i$) increases in steps of about 626 Ω, 710Ω, and 838Ω starting from 10 kΩ, responsive to steps in AO fluence of 33%, 66%, strips provide additional reliability; when an issue occurs with one strip, the remaining two are still able to provide data.

Figure 6:
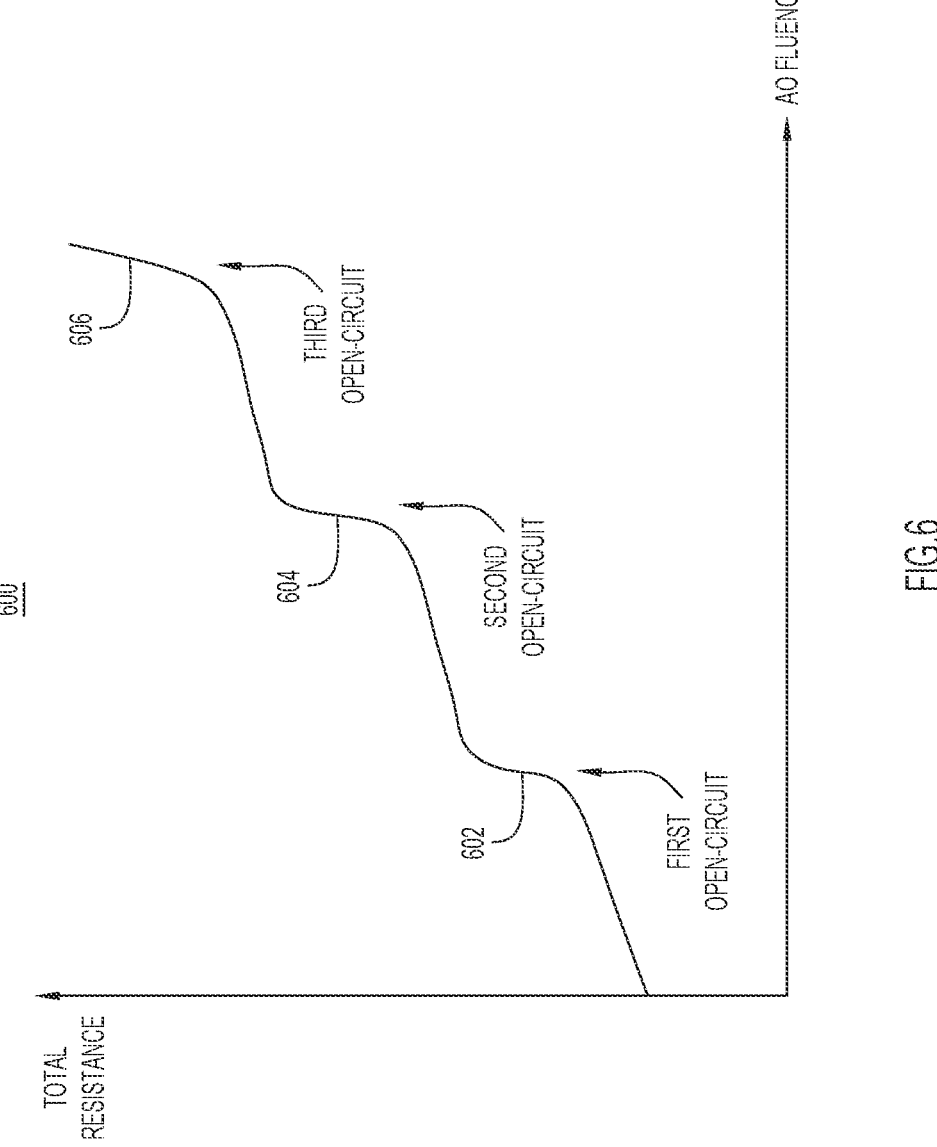
FIG. 6 is an illustration of an example total resistance vs. atomic-oxygen-fluence response or profile of the atomic oxygen sensor of FIG. 5.

FIG. 6 is an illustration of an example total resistance vs. atomic-oxygen-fluence profile 600 of atomic oxygen sensor 500. According to resistance vs. atomic-oxygen-fluence profile 600, the total resistance gradually increases with atomic oxygen fluence, except at points 602, 604, and 606, where the resistance steps-up as the first, second, and third graphite strips break in sequence due to increasing atomic oxygen fluence. Thus, the total resistance vs. atomic-oxygen-fluence profile exhibits a stepped resistance profile.

Figure 7B:
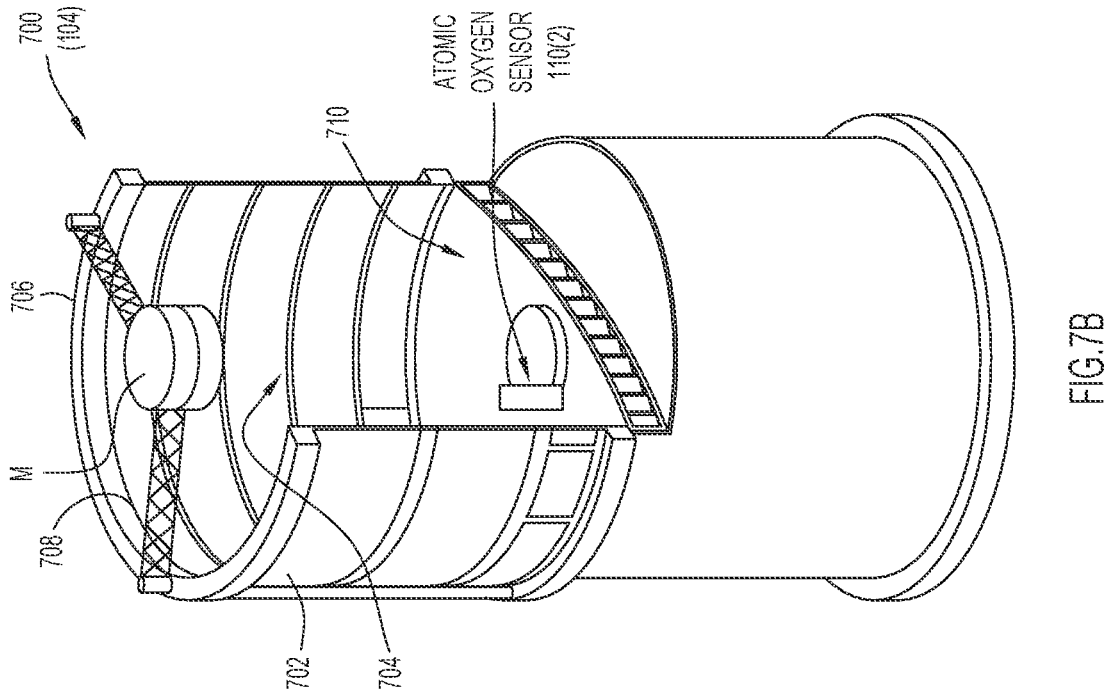
FIGS. 7A and 7B are illustrations of an example housing of a spacecraft useful for showing a positional arrangement of two atomic oxygen sensors on the spacecraft.
Figure 7A:
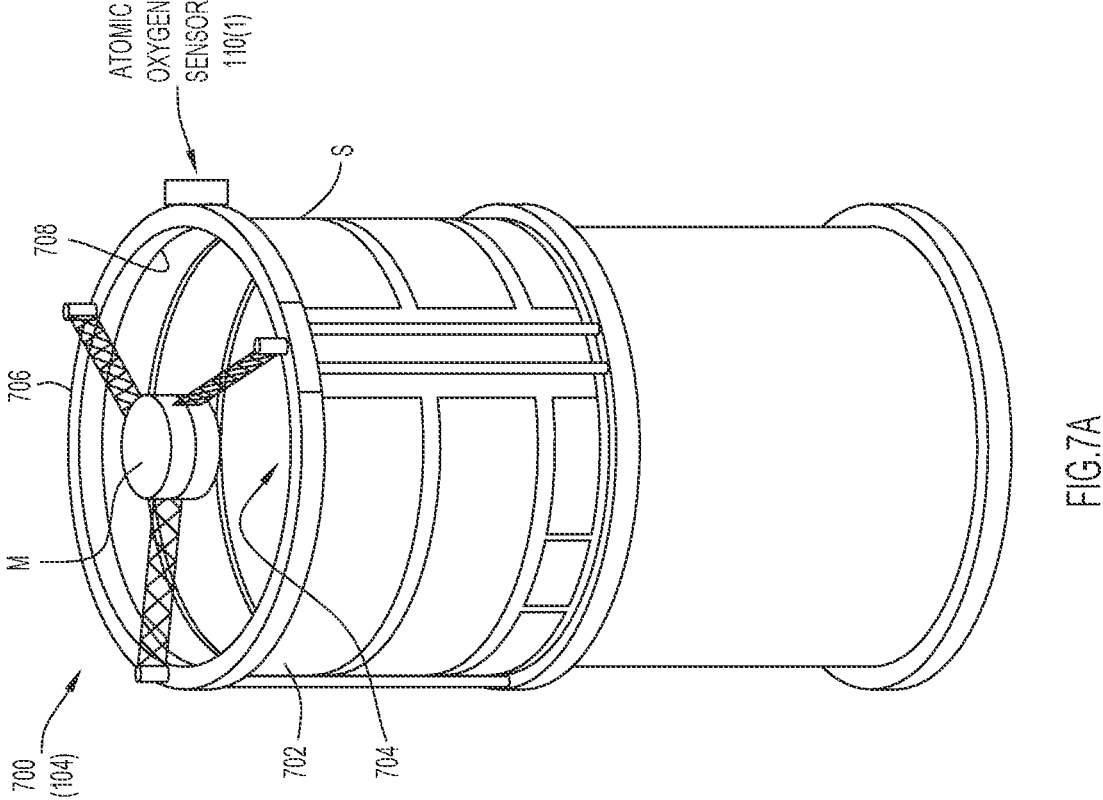

Reference is now made to FIGS. 7A and 7B, which are illustrations of an example housing 700 of spacecraft 104 useful for showing a positional arrangement of two atomic oxygen sensors on the spacecraft. Housing 700 has a sidewall 702 that is cylindrical to enclose an interior volume 704 that is cylindrical. Sidewall 702 has a periphery 706 that defines an opening 708 into interior volume 704. A telescope component M (e.g., a telescope reflector) may be mounted to periphery 706, but does not block opening 708 fully. Thus, opening 708 provides fluid communication between interior volume 704 and space surrounding housing 700 (and that is outside of the interior volume). In the illustrated example, atomic oxygen sensor 110(1) is mounted to an exterior surface S of sidewall 702 so as to be directly exposed to (and therefore able to sense) atomic oxygen in the space surrounding housing 700 and that is incident to the exterior surface. Atomic oxygen sensor 110(2) is mounted to an interior surface 710 that is inside housing 700, i.e., within interior volume 704. Atomic oxygen sensor 110(2) senses atomic oxygen that flows into interior volume 704 from the space surrounding housing 700. Having atomic oxygen sensor 110(2) (the "inside sensor") inside and atomic oxygen sensor 110(1) (the "outside sensor") outside housing 700 enables determination of how much atomic oxygen reaches the inside sensor relative to the outside sensor. This in turn provides an indication of how effective housing 700 is at blocking the atomic oxygen from reaching interior volume 704 of spacecraft 104.

Atomic oxygen sensor 110(1) and atomic oxygen sensor 110(2) provide to controller 116 indications of a first or external atomic oxygen fluence incident to external surface S and a second or internal atomic oxygen fluence present in interior volume 704, respectively. This may be referred to as external and internal "differential sensing" of the atomic oxygen on spacecraft 104. Based on the differential indications from the two atomic oxygen sensors, controller 116 (or ground station 106) can compute a difference between (or at least compare) the first atomic oxygen fluence and the second atomic oxygen fluence. Controller 116 may take an action based on the difference as computed or result of the comparison. For example, controller 116 may send maneuver commands (which may originate at the controller or from ground station 106) to thrusters 120 to reposition or reorient spacecraft 104 to reduce the exposure of atomic oxygen sensor 110(2) to the atomic oxygen and thereby reduce erosion of internal components of spacecraft 104.

FIG. 8 is a flowchart of an example method 800 performed by a sensor system (e.g., sensor system 108) on a spacecraft. The spacecraft includes atomic oxygen sensors and temperature sensors configured as thermistors fixed at various positions on the spacecraft.

At 802, the atomic oxygen sensors, which include graphite strips to provide resistances that increase as the graphite strips ablate away when exposed to atomic oxygen, respectively generate first sensor signals indicative of the resistances and, correspondingly, atomic oxygen fluence to which the atomic oxygen sensors are exposed.

At 804, the thermistors respectively generate second sensor signals indicative of resistances of the thermistors and correspondingly temperatures of the thermistors.

At 806, first sensor circuits respectively convert the first sensor signals to digitized first signals and second sensor circuits respectively convert the second sensor signals to digitized second signals. The first sensor circuits and the second sensor circuits may be configured identically to each other so as to be interchangeable with other.

At 808, a controller processes the first and second digitized signals. For example, the controller:

a. Stores resistance versus atomic-oxygen-fluence profiles for the atomic oxygen sensors, and performs fitting of resistance data points to a time curve.

b. Converts the digitized first signals to values of the atomic oxygen fluence based on the profiles.

c. Computes a difference between at least two of the values and takes an action, e.g., causing repositioning of the spacecraft responsive to the difference values. For example, the atomic sensors may include a first atomic oxygen sensor positioned on an exterior surface of a housing of the spacecraft, to generate a first sensor signal indicative of an exterior atomic oxygen fluence incident to the exterior surface. The atomic sensors may include a second atomic oxygen sensor mounted inside the housing to generate a second sensor signal indicative of an interior atomic oxygen fluence inside the housing. The controller computes a difference between values for the interior atomic oxygen fluence and the exterior atomic oxygen fluence.

d. Stores resistance versus temperature profiles for the thermistors.

e. Converts the digitized second signals to temperature values based on the thermistor profiles.

Controller 116 may perform a subset of operations (a)-(e), e.g., one or more of the operations.

Figure 9:
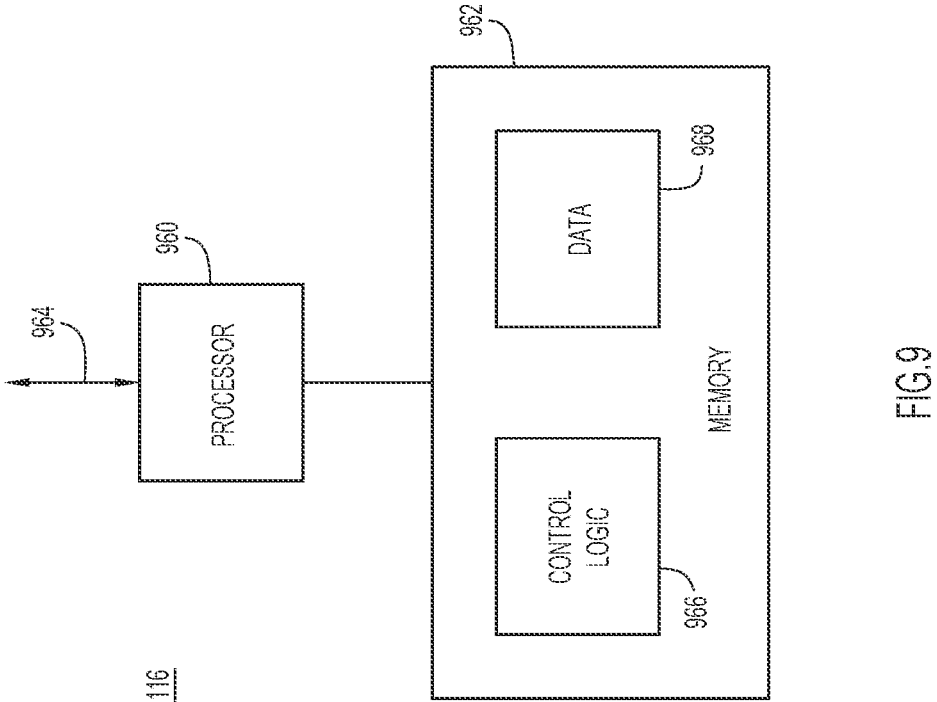
FIG. 9 is a block diagram of an example controller of the sensor system.

FIG. 9 is a block diagram of controller 116 according to an embodiment. Controller 116 includes processor(s) 960 and a memory 962 coupled to one another. The aforementioned components may be implemented in hardware, software, or a combination thereof. Processor(s) 960 communicate with sensor circuitry 114, thrusters 120, and telemetry radio 118 over interfaces 964. Memory 962 stores control software 966 (referred as "control logic"), that when executed by the processor(s) 960, causes the processor(s), and more generally, controller 116, to perform the various operations described herein. The processor(s) 960 may be a microprocessor or microcontroller (or multiple instances of such components). The memory 962 may include read only memory (ROM), random access memory (RAM), magnetic disk storage media devices, optical storage media devices, flash memory devices, electrical, optical, or other physically tangible (i.e., non-transitory) memory storage devices. Controller 116 may also be discrete logic embedded within an integrated circuit (IC) device.

Thus, in general, the memory 962 may comprise one or more tangible (non-transitory) computer readable storage media (e.g., memory device(s)) encoded with software or firmware that comprises computer executable instructions. For example, control software 966 includes logic to implement operations performed by the controller 116. Thus, control software 966 implements the various methods/operations described herein.

In addition, memory 962 stores data 968 used and produced by control software 966.

In some aspects, the techniques described herein relate to a sensor system for a spacecraft including: atomic oxygen sensors including graphite strips to provide resistances that increase when exposed to atomic oxygen that erodes the graphite strips, the atomic oxygen sensors configured to generate first sensor signals indicative of the resistances and, correspondingly, atomic oxygen fluence to which the atomic oxygen sensors are exposed; thermistors to generate second sensor signals indicative of temperature; sensor circuits that are identically configured to each other and that include first sensor circuits to convert the first sensor signals to digitized first signals and second sensor circuits to convert the second sensor signals to digitized second signals; and a controller to process the digitized first signals and the digitized second signals.

In some aspects, the techniques described herein relate to a sensor system, wherein the sensor circuits include: identically configured conditioning circuits to filter and amplify the first sensor signals and the second sensor signals to produce conditioned signals; and identically configured analog-to-digital converters (ADCs) to digitize the conditioned signals to produce the digitized first signals and the digitized second signals.

In some aspects, the techniques described herein relate to a sensor system, wherein: the ADCs are configured to digitize the conditioned signals responsive to a common reference voltage and a common clock signal.

In some aspects, the techniques described herein relate to a sensor system, further including: a multiplexer to multiplex the digitized first signals and the digitized second signals to a multiplexed signal under control of the controller, and to provide the multiplexed signal to the controller.

In some aspects, the techniques described herein relate to a sensor system, wherein the controller is configured to: store resistance versus atomic-oxygen-fluence profiles for the atomic oxygen sensors; and convert the digitized first signals to values of the atomic oxygen fluence based on the resistance versus the atomic-oxygen-fluence profiles.

In some aspects, the techniques described herein relate to a sensor system, wherein an atomic oxygen sensor of the atomic oxygen sensors includes: a substrate; opposing electrodes formed on the substrate so as to be separated from each; and individual graphite strips formed on the substrate and being uncovered so as to be exposed to the atomic oxygen, wherein the individual graphite strips have individual resistances and are connected to the opposing electrodes in parallel to form parallel resistances that combine into a total resistance of the atomic oxygen sensor.

In some aspects, the techniques described herein relate to a sensor system, wherein: the individual graphite strips are formed with individual graphite thicknesses that differ from one another such that the individual resistances differ from one another.

In some aspects, the techniques described herein relate to a sensor system, wherein: the individual graphite strips are configured to degrade to open-circuit resistances when exposed to individual maximum atomic oxygen fluence that differ from one another.

In some aspects, the techniques described herein relate to a sensor system, wherein: the individual graphite strips are formed with individual graphite thicknesses that are equal to each other such that the individual resistances are equal to each other.

In some aspects, the techniques described herein relate to a sensor system, wherein: the individual resistances of the individual graphite strips increase according to individual resistance versus atomic-oxygen-fluence profiles that combine to form a stepped total resistance versus atomic-oxygen-fluence profile for the total resistance.

In some aspects, the techniques described herein relate to a sensor system, wherein the graphite strips of different ones of the atomic oxygen sensors are formed with different thicknesses to sense different maximum atomic fluence respectively.

In some aspects, the techniques described herein relate to a sensor system, wherein the spacecraft includes a housing and the atomic oxygen sensors include: a first atomic oxygen sensor positioned on an exterior surface of the housing to generate a first sensor signal indicative of an exterior atomic oxygen fluence that is incident to the exterior surface; and a second atomic oxygen sensor mounted inside the housing to generate a second sensor signal indicative of an interior atomic oxygen fluence inside the housing.

In some aspects, the techniques described herein relate to a sensor system, wherein: the controller computes a difference between the interior atomic oxygen fluence and the exterior atomic oxygen fluence based on the second sensor signal and the first sensor signal.

In some aspects, the techniques described herein relate to a sensor system, wherein: the atomic oxygen sensors and the thermistors each operates over a common resistance range; the first sensor signals and the second sensor signals each has distinct amplitudes across a range of amplitudes that indicate distinct resistances across the common resistance range; and each sensor circuit converts the distinct amplitudes to corresponding distinct digitized values.

In some aspects, the techniques described herein relate to a method performed by a sensor system on a spacecraft, including: by atomic oxygen sensors including graphite strips to provide resistances that increase as the graphite strips ablate away when exposed to atomic oxygen, generating first sensor signals indicative of the resistances and, correspondingly, atomic oxygen fluence to which the atomic oxygen sensors are exposed; by thermistors, generating second sensor signals indicative of temperature; by sensor circuits that are identically configured to each other and that include first sensor circuits and second sensor circuits, by the first sensor circuits, converting the first sensor signals to digitized first signals, and by the second sensor circuits, converting the second sensor signals to digitized second signals; and processing the digitized first signals and the digitized second signals.

In some aspects, the techniques described herein relate to a method, further including: multiplexing the digitized first signals and the digitized second signals to a multiplexed signal, and providing the multiplexed signal to a controller.

In some aspects, the techniques described herein relate to a method, further including: storing resistance versus atomic-oxygen-fluence profiles for the atomic oxygen sensors; and converting the digitized first signals to values of the atomic oxygen fluence based on the resistance versus the atomic-oxygen-fluence profiles.

In some aspects, the techniques described herein relate to an atomic oxygen sensor including: a substrate; opposing electrodes formed on the substrate and being separated from each other; and graphite strips connected to the opposing electrodes to form resistances in parallel, the graphite strips being uncovered to be exposed to atomic oxygen that erodes the graphite strips to increase the resistances over time.

In some aspects, the techniques described herein relate to an atomic oxygen sensor, wherein the graphite strips have equal thicknesses.

In some aspects, the techniques described herein relate to an atomic oxygen sensor, wherein the graphite strips have different thicknesses.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A sensor system for a spacecraft comprising:
atomic oxygen sensors including graphite strips to provide resistances that increase when exposed to atomic oxygen that erodes the graphite strips, the atomic oxygen sensors configured to generate first sensor signals indicative of the resistances and, correspondingly, atomic oxygen fluence to which the atomic oxygen sensors are exposed;
thermistors to generate second sensor signals indicative of temperature;
sensor circuits that are identically configured to each other and that include first sensor circuits to convert the first sensor signals to digitized first signals and second sensor circuits to convert the second sensor signals to digitized second signals, wherein the sensor circuits include identically configured conditioning circuits to filter and amplify the first sensor signals and the second sensor signals to produce conditioned signals, and identically configured analog-to-digital converters (ADCs) to digitize the conditioned signals to produce the digitized first signals and the digitized second signals; and
a controller to process the digitized first signals and the digitized second signals.

2. The sensor system of claim 1, wherein:
the ADCs are configured to digitize the conditioned signals responsive to a common reference voltage and a common clock signal.

3. The sensor system of claim 1, further comprising:
a multiplexer to multiplex the digitized first signals and the digitized second signals to a multiplexed signal under control of the controller, and to provide the multiplexed signal to the controller.

4. The sensor system of claim 1, wherein the controller is configured to:
store resistance versus atomic-oxygen-fluence profiles for the atomic oxygen sensors; and
convert the digitized first signals to values of the atomic oxygen fluence based on the resistance versus the atomic-oxygen-fluence profiles.

5. The sensor system of claim 1, wherein an atomic oxygen sensor of the atomic oxygen sensors includes:
a substrate;
opposing electrodes formed on the substrate so as to be separated from each; and
individual graphite strips formed on the substrate and being uncovered so as to be exposed to the atomic oxygen, wherein the individual graphite strips have individual resistances and are connected to the opposing electrodes in parallel to form parallel resistances that combine into a total resistance of the atomic oxygen sensor.

6. The sensor system of claim 5, wherein:
the individual graphite strips are formed with individual graphite thicknesses that differ from one another such that the individual resistances differ from one another.

7. The sensor system of claim 6, wherein:
the individual graphite strips are configured to degrade to open-circuit resistances when exposed to individual maximum atomic oxygen fluence that differ from one another.

8. The sensor system of claim 5, wherein:
the individual graphite strips are formed with individual graphite thicknesses that are equal to each other such that the individual resistances are equal to each other.

9. The sensor system of claim 5, wherein:
the individual resistances of the individual graphite strips increase according to individual resistance versus atomic-oxygen-fluence profiles that combine to form a stepped total resistance versus atomic-oxygen-fluence profile for the total resistance.

10. The sensor system of claim 1, wherein the graphite strips of different ones of the atomic oxygen sensors are formed with different thicknesses to sense different maximum atomic fluence respectively.

11. The sensor system of claim 1, wherein the spacecraft includes a housing and the atomic oxygen sensors include:
a first atomic oxygen sensor positioned on an exterior surface of the housing to generate a first sensor signal indicative of an exterior atomic oxygen fluence that is incident to the exterior surface; and
a second atomic oxygen sensor mounted inside the housing to generate a second sensor signal indicative of an interior atomic oxygen fluence inside the housing.

12. The sensor system of claim 11, wherein:
the controller computes a difference between the interior atomic oxygen fluence and the exterior atomic oxygen fluence based on the second sensor signal and the first sensor signal.

13. The sensor system of claim 1, wherein:
the atomic oxygen sensors and the thermistors each operates over a common resistance range;
the first sensor signals and the second sensor signals each has distinct amplitudes across a range of amplitudes that indicate distinct resistances across the common resistance range; and
each sensor circuit converts the distinct amplitudes to corresponding distinct digitized values.

14. A method performed by a sensor system on a spacecraft, comprising:
by atomic oxygen sensors including graphite strips to provide resistances that increase as the graphite strips ablate away when exposed to atomic oxygen, generating first sensor signals indicative of the resistances and, correspondingly, atomic oxygen fluence to which the atomic oxygen sensors are exposed;
by thermistors, generating second sensor signals indicative of temperature;
by sensor circuits that are identically configured to each other and that include first sensor circuits and second sensor circuits, by the first sensor circuits, converting the first sensor signals to digitized first signals, and by the second sensor circuits, converting the second sensor signals to digitized second signals, wherein the sensor circuits include identically configured conditioning circuits to filter and amplify the first sensor signals and the second sensor signals to produce conditioned signals, and identically configured analog-to-digital converters (ADCs) to digitize the conditioned signals to produce the digitized first signals and the digitized second signals; and
processing the digitized first signals and the digitized second signals.

15. The method of claim 14, further comprising:
multiplexing the digitized first signals and the digitized
   second signals to a multiplexed signal, and providing
   the multiplexed signal to a controller.

16. The method of claim 14, further comprising:
storing resistance versus atomic-oxygen-fluence profiles
   for the atomic oxygen sensors; and
converting the digitized first signals to values of the
   atomic oxygen fluence based on the resistance versus
   the atomic-oxygen-fluence profiles.

\* \* \* \* \*